(12) United States Patent
Bratschi et al.

(10) Patent No.: US 8,746,667 B2
(45) Date of Patent: Jun. 10, 2014

(54) MACHINE TOOL HAVING A WORKPIECE TABLE

(75) Inventors: Frank Bratschi, Biel (CH); Jan Konvicka, Biel (CH); Markus Kindler, Subingen (CH)

(73) Assignee: Mikron Agie Charmilles AG, Nidau (CH)

( * ) Notice: Subject to any disclaimer, the term of this patent is extended or adjusted under 35 U.S.C. 154(b) by 135 days.

(21) Appl. No.: 13/407,287

(22) Filed: Feb. 28, 2012

(65) Prior Publication Data
US 2012/0223469 A1    Sep. 6, 2012

(30) Foreign Application Priority Data

Mar. 4, 2011 (EP) .................................... 11157030

(51) Int. Cl.
*B23Q 1/64* (2006.01)
*B25B 1/00* (2006.01)
*B43L 5/00* (2006.01)
*B23Q 3/18* (2006.01)

(52) U.S. Cl.
USPC .................................. 269/58; 269/56; 269/86

(58) Field of Classification Search
USPC .............................................. 269/58, 56, 86
See application file for complete search history.

(56) References Cited

U.S. PATENT DOCUMENTS

| 6,059,703 | A  | * | 5/2000  | Heisel et al. ..................... 483/31 |
| 6,497,539 | B2 | * | 12/2002 | Marroncelli .................. 409/146 |
| 6,668,692 | B1 | * | 12/2003 | Thiele et al. ....................... 83/74 |
| 7,784,121 | B2 | * | 8/2010  | Ahlman ........................ 5/81.1 R |
| 2010/0032879 | A1 | | 2/2010 | Ladra et al. |

FOREIGN PATENT DOCUMENTS

| DE | 102006049867 A1 | 4/2008 |
| JP |    61146440 A * | 7/1986 ............... B23Q 1/18 |

* cited by examiner

*Primary Examiner* — Lee D Wilson
*Assistant Examiner* — Alvin Grant
(74) *Attorney, Agent, or Firm* — Bachman & LaPointe, P.C.

(57) ABSTRACT

A machine tool having a machine frame and a workpiece table. It is provided that the workpiece table (5), on one of its sides (14), is held on the machine frame (2) by a holding device (4), the holding device (4) having at least two holding elements (6, 7), which are spaced apart from one another on the said side (14) of the workpiece table (5) and which are disposed at differing height positions (9, 10), such that an upper and a lower holding element (6, 7) is realized, and at least one of the holding elements (6, 7) being equipped with at least one piezo actuator (24) for altering its length and, associated therewith, influencing the position of the workpiece table.

20 Claims, 2 Drawing Sheets

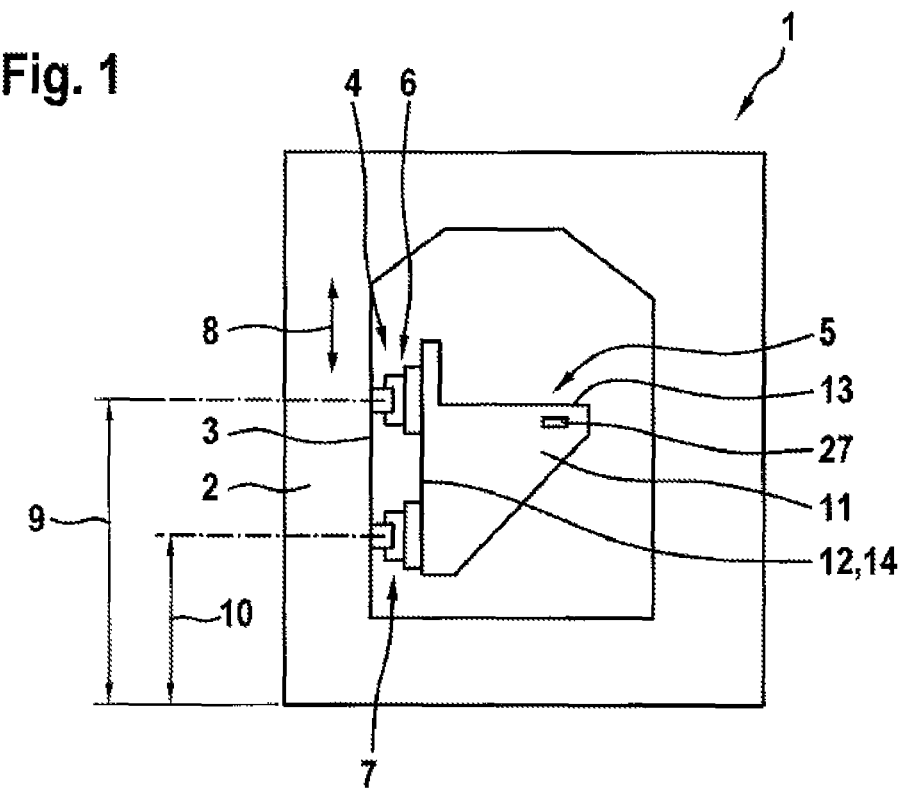
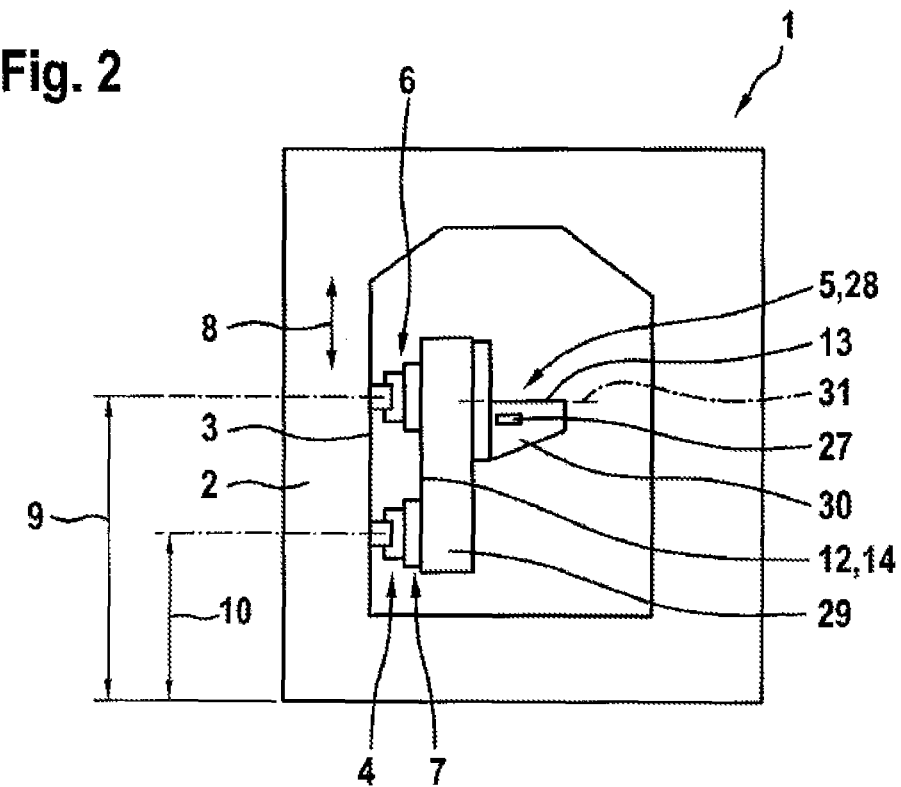

MACHINE TOOL HAVING A WORKPIECE TABLE

BACKGROUND OF THE INVENTION

The invention relates to a machine tool having a machine frame and a workpiece table.

In the case of machine tools of the type stated at the outset, deformations and, consequently, errors in the machine tool geometry can occur because of differing workpiece loads and machining loads of the workpiece table. These geometry errors can reduce the accuracy of the workpiece. The requirement for highly accurate workpieces and/or greater automation and/or increased productivity makes it necessary to eliminate, or at least reduce these geometry errors. Alternatively, or additionally, unwanted vibrations can occur during machining. These vibrations affect the machining throughput of the machine tool and reduce the accuracy and the surface quality of the workpieces.

Known from DE 10 2006 049 867 A1 is a machine tool having a workpiece clamping device on a workpiece table, for the purpose of clamping a workpiece. The workpiece clamping device can be moved by means of piezo actuators, in order to reduce vibrations occurring during the machining operation. For this purpose, on the workpiece table there is a so-called piezo table, realized in the manner of a frame, the workpiece clamping device being located within the frame. A piezo actuator serves to position the workpiece clamping device in respect of height, and four further piezo actuators position the workpiece clamping device relative to the frame. In addition to the active mounting by means of the piezo actuators, passive mounting is provided, which is realized in that a spring-loaded strut acts in parallel with each piezo actuator. In order to effect positioning movements of the piezo actuators, a feedback control is provided, which registers errors in the position of the workpiece clamping device in relation to the piezo table mounted in a fixed manner on the workpiece table and corrects these errors in order to prevent vibrations. The result of all of that is that the known machine tool is provided with a piezo device for positioning a workpiece clamping device in order to prevent vibrations. However, this does not affect the machine-tool geometry errors mentioned at the outset. The application possibilities for such a known arrangement are therefore limited and, depending on the size and weight of the workpiece, require corresponding embodiments of the piezo table and piezo actuators, in addition to spring-loaded struts.

It is an object of the invention to create a machine tool, of the type mentioned at the outset, that can be used to produce highly accurate workpieces having a first-class surface quality, without the need for additional devices adapted to the workpieces.

SUMMARY OF THE INVENTION

The foregoing object is achieved according to the invention in that the workpiece table, on one of its sides, is held on the machine frame by means of a holding device, the holding device having at least two holding elements, which are spaced apart from one another on the said side of the workpiece table and which are disposed at differing height positions, such that an upper and a lower holding element is realized, and at least one of the holding elements being equipped with at least one piezo actuator for altering its length and, associated therewith, influencing the position of the workpiece table. The design according to the invention enables the position of the workpiece to be altered or maintained by means of the at least one piezo actuator. If workpiece loads and/or machining loads result in deformations, and consequently in corresponding errors in the machine geometry, the resultant error on the workpiece can be compensated, or at least partially compensated, through corresponding alteration of the position of the workpiece table. It is also possible to compensate, or at least partially compensate, any vibrations that occur, in that the workpiece table is held in a desired position by "counter-vibrations" by means of the piezo element. Since the workpiece table is held on the machine frame on one of the sides of the workpiece table, the side of the workpiece table that is opposite this side is not supported on the machine frame, and therefore tends to yield when subjected to load, as a result of which the position of the workpiece table is influenced and, consequently, the position of a workpiece located on the workpiece table is altered. The arrangement of at least two holding elements that are spaced apart from one another and differing in their height position makes it possible to influence the position of the entire workpiece table, at least one of the holding elements being altered in its length by means of the at least one piezo actuator. Alteration of the length of one holding element relative to the other holding element results in a corresponding tilting movement of the side of the workpiece table on which the fastening to the machine frame is provided, with the result that the table surface of the workpiece table, lying transversely, in particular at right angles, in relation to said side, undergoes a corresponding correction of its position. From this it becomes clear that, with only few means and without additional, workpiece-specific measures, a machine tool is created that makes it possible to produce highly accurate workpieces having a perfect surface quality.

In the case of a development of the invention, it is provided that one of the holding elements, in particular the upper holding element, constitutes a fixed bearing, and the other of the holding elements, in particular the lower holding element, is provided with the piezo actuator. The aforementioned tilting movement through control of the piezo actuator is possible, despite the one holding element being realized as a fixed bearing having a high degree of stiffness, since such a bearing always has a certain elasticity and therefore allows the tilting movement. Alternatively, the fixed bearing can also be a swivel bearing having a defined axis of rotation.

According to a development of the invention, it is provided that the holding elements each have a linear guide, preferably extending horizontally, and each have a holding member, the holding member being guided so as to be movable along the linear guide. The linear guide can preferably be realized as a guide rail extending rectilinearly. Since the holding members can be moved along the linear guides, the workpiece table can be moved on the machine frame, preferably moved horizontally. Also, if they are movable, preferably one of the holding elements is realized as a fixed bearing and the other is provided with the piezo actuator. A fixed bearing thus does not mean that no alteration of position is possible along the linear guide, but that the bearing is constructed so as to be stiff, i.e. without play, but nevertheless has a sufficient resilience (elasticity) to allow alterations of position effected by the piezo actuator on the other holding element.

According to a development of the invention, it is provided that the piezo actuator is disposed between the linear guide and the machine frame and/or the holding member is provided with the piezo actuator. If the piezo actuator is located between the linear guide and the machine frame, the linear guide can be displaced, as a result of which the corresponding holding member, and therefore also the workpiece table, is displaced. If the piezo actuator is located on the holding member, the linear guide does not alter its position in relation to the machine frame, but the holding member alters its position, as a result of which the position of the workpiece table is altered accordingly.

It is advantageous, according to a development of the invention, if the linear guide is disposed directly on the machine frame. The linear guide, preferably realized as a rectilinear guide rail, is therefore fastened directly to the machine frame or, alternatively, realized on the machine frame.

A development of the invention provides that the holding member has two carrier elements, elastically biased towards one another, between which the piezo actuator is disposed in a clamped manner. Because of the two carrier elements, biased towards one another, which between them accommodate the piezo actuator, a holding member realized thus constitutes a unit that constrains in a fixed manner, without play, and which, in particular, has a reproducible length and can nevertheless be varied in its length upon activation of the piezo actuator, since this allows the elastic biasing of the carrier elements, which, owing to the biasing, then also bear without play on the piezo actuator.

Another development of the invention preferably provides that the holding member has a single-piece carrier part, in particular composed of solid material, which has at least one recess in which the piezo actuator is located, in particular without play. Because of the single-piece realization of the holding member, a component is created that is highly dimensionally stable and that nevertheless, owing to the elasticity of its material (intrinsic elasticity), provides for alteration of length in that the piezo actuator located in the recess widens the recess elastically, as a result of which the corresponding sides of the carrier part are displaced concomitantly. Such a design is very stiff and can be subjected to high mechanical loads without resultant unwanted deformations. The carrier part is composed, in particular, of solid material, preferably of metal, in particular of steel.

Preferably, according to a development of the invention, it is provided that one of the carrier elements or one side of the carrier part is fastened, in particular directly or indirectly, to the workpiece table. "Direct" in the relevant parts of this application is to be understood to mean that the corresponding parts are fastened directly to one another. "Indirect" means that the two parts are fastened to one another with the interposition of at least one further component.

In particular, it can be further provided that the other of the carrier elements or the other side of the carrier part is fastened, in particular directly or indirectly, to the machine frame.

A development of the invention provides that the holding member has a guide carriage, which can be moved along the linear guide, the other of the carrier elements or the other side of the carrier part being fastened to the guide carriage. Consequently, the holding element—starting from the machine frame—is composed of the linear guide and the then succeeding holding member, the holding member being provided with the guide carriage. As viewed in the direction of the workpiece table, according to the one exemplary embodiment the guide carriage is adjoined by the carrier element, then by the piezo actuator and then by the further carrier element or—according to the other exemplary embodiment—the guide carriage is adjoined by the carrier part.

It is preferably provided that the workpiece table projects away from the machine frame in the manner of a balcony. Because of the holding device disposed on one of its sides, the workpiece table projects away from the machine frame. In particular, the holding elements are disposed, on the one hand, on a region of the machine frame that preferably extends vertically and, on the other hand, on a region of the workpiece table that preferably extends vertically. The table surface of the workpiece table preferably lies in a horizontal plane (insofar as the workpiece table is not additionally adjustable per se).

If the workpiece table is not "adjustable per se", it is a rigid table. Alternatively, it can be provided that the workpiece table is a swivelling table, which has a base, which is connected to the holding device and on which a table arrangement is mounted such that it can be swivelled. The base is preferably fastened to the machine frame by means of the holding device. The swivel axis preferably runs in the horizontal direction, and enables the table arrangement to be swivelled relative to the base.

According to a preferred exemplary embodiment of the invention, it is provided that a plurality of holding elements, each being without a piezo actuator or being equipped with at least one piezo actuator, are disposed at one and the same height position. For example, two holding elements can be located at one height position and likewise two holding elements can be located at another height position. At least one of the holding elements is equipped with the piezo actuator. If the latter is activated, the workpiece table will execute a tilting movement, both about a horizontal axis and about a vertical axis. If all holding elements of one height position are equipped with piezo actuators and if these are controlled in the same way, such that like alterations in length are effected, the workpiece table is tilted about a horizontal axis. If two holding elements at differing height positions, but in approximately or exactly one and the same vertical alignment, are provided with piezo actuators, and if the latter are activated, a tilting movement of the workpiece table about a vertical axis is effected. Depending on the number of holding elements provided with a piezo actuator or without a piezo actuator, and on their positioning and on the number of height positions used—according to the aforementioned, relatively simple exemplary embodiment—corresponding displacement motions of the workpiece table are possible. The invention is therefore not limited to the aforementioned exemplary embodiment provided with four holding elements, but more or fewer holding elements can also be provided, at correspondingly like or differing height positions and/or horizontally offset positions, and/or also at positions offset obliquely in the horizontal direction, each of these being able to be without a piezo actuator or equipped with a piezo actuator.

A preferred exemplary embodiment of the invention provides that the piezo actuator is controlled in dependence on at least one sensor, in particular a position sensor and/or speed sensor and/or acceleration sensor, of the machine tool. This sensor therefore constitutes a pickup that registers unwanted deformations or vibrations of the machine tool and results in the at least one piezo actuator being controlled accordingly in order that the latter alters its length for the purpose of thus counteracting the deformations and/or vibrations.

Preferably, the sensor is realized as a strain gauge.

Finally, it is advantageous if a control unit and/or feedback control unit is provided, which controls the at least one piezo actuator in dependence on information supplied by the at least one sensor.

BRIEF DESCRIPTION OF THE DRAWINGS

The drawings illustrate the invention on the basis of exemplary embodiments, wherein:

FIG. 1 shows a schematic representation of a machine tool having a workpiece table, FIG. 2 shows a machine tool having a workpiece table, according to a further exemplary embodiment.

DETAILED DESCRIPTION

Figure 3:
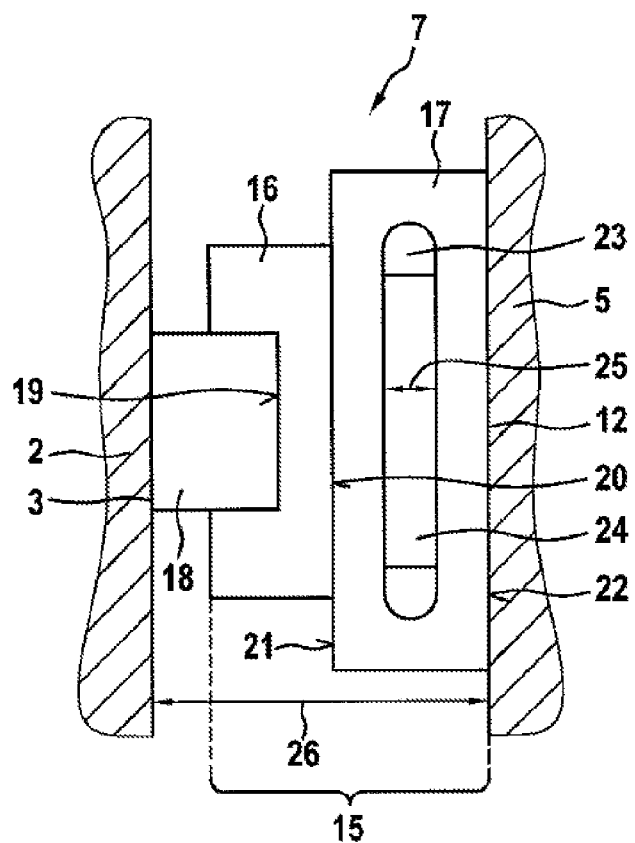
FIG. 3 shows a holding element, by means of which the workpiece table is fastened to a machine frame of the machine tool.

FIG. 1 shows—in a schematic representation—parts of a machine tool 1, which has a machine frame 2. The machine frame 2 has a vertical wall 3, on which a workpiece table 5 is disposed by means of a holding device 4. The holding device 4 has holding elements 6, 7, which are spaced apart from one another and which—in relation to the vertical direction (arrow 8) of the vertical wall 3—are located at differing height positions 9, 10. The workpiece table 5 is held on the machine frame 2 by means of the two holding elements 6, 7.

In the exemplary embodiment of FIG. 1, the workpiece table 5 is realized as a rigid table 11. It has a vertically extending back wall 12, and extending transversely, in particular at right angles, in relation thereto there is a table surface 13 that serves to receive a workpiece, not represented, or a workpiece pallet, not represented. As can be seen from FIG. 1, the workpiece table 5, on one of its sides 14, namely, on its back wall 12, is held on the machine frame 2 by means of the holding device 4. Since the table surface 13 extends transversely, in particular at right angles, in relation to the side 14, the workpiece table 5 projects away from the machine frame 2 in the manner of a balcony.

FIG. 3 elucidates the design of the holding elements 6, 7. FIG. 3 shows only a portion of the machine frame 2 and a portion of the workpiece table 5 in the region of its back wall 12. Specifically, the holding element 7, i.e. the lower holding element as shown in FIG. 1 (height position 10) is represented in FIG. 3. The holding element 6 will also be described in the following.

The holding element 7 of FIG. 3 has a holding member 15, which—starting from the machine frame 2 and going towards the workpiece table 5—is composed of a guide carriage 16 and a carrier part 17. Further, the holding element 7 has a linear guide 18, which is realized as a guide rail extending rectilinearly. The linear guide 18 extends in the horizontal direction, and is fastened directly to the machine frame 2, in particular to the vertical wall 3 (FIG. 1). Consequently, the holding member 15, namely, its guide carriage 16, can be moved along the linear guide 18 into and back out of the plane of the drawing of FIG. 3, such that, accordingly, the workpiece table 5 can be displaced horizontally on the machine frame 2. The guide carriage 16 is guided with one side 19 thereof on the linear guide 18 and, with its other side 20, is connected to a side 21 of the carrier part 17, the other side 22 of which is connected to the back wall 12 of the workpiece table 5. The carrier part 17 is made of solid material, in particular steel, preferably as a single piece. It has a recess 23, in the manner of an oblong hole, which is located between the two sides 21 and 22. Disposed without play in the recess 23 there is a piezo actuator 24, which can be controlled electrically in an appropriate manner (not represented), causing it to alter its dimension 25, as a result of which it elastically deforms the carrier part 17, such that the spacing of the sides 21 and 22 is altered by a corresponding magnitude. The result of this is that the length 26 of the holding element 7 is increased or reduced, such that the workpiece table 5, at the level of the holding element 7, assumes a correspondingly greater or lesser distance from the machine frame 2.

The holding element 6, which—according to FIG. 1, constitutes an upper holding element (height position 9), is realized just like the holding element 7 of FIG. 3, but the carrier part 17 does not have a piezo actuator 24, such that—if desired—it is also possible to dispense with the recess 23. To that extent, the holding element 6 constitutes a fixed bearing, since, because there is no piezo actuator, it assumes a position that, to that extent, is fixed. This nevertheless means that—just like the holding element 7—it can be moved along the linear guide 18 assigned to it. This fixed bearing, which—like any however "tight bearing"—clearly has a certain elasticity, holds the workpiece table 5 at a constant distance from the machine frame 2, while the holding element 7 can effect an alteration of the length 26, because of the piezo actuator 24. As a result of this, the workpiece table 5 tilts about a horizontal axis that runs through the holding element 6, i.e. it is possible to influence the position of the workpiece table.

The arrangement in this case is configured such that a feedback control unit, not represented, is provided, which controls the piezo actuator 24 in dependence on an information signal supplied by a sensor 27. The sensor 27, which is shown merely schematically in FIG. 1 and whose mounting position in the workpiece table 5 is represented merely by way of example in FIG. 1 (it could also be located at an entirely different position on the machine tool 1), senses deformations and/or vibrations of the machine tool 1 and influences the feedback control unit, which—for the purpose of compensating the deformation and/or vibrations—controls the piezo actuator 24 accordingly. The said deformations and/or vibrations occur during the operation of the machine tool 1, for example caused by the machining of a workpiece clamped on the table surface 13 of the workpiece table 5.

The arrangement in this case can be configured such that—in other respects correspondingly similar to FIG. 1—two holding elements 6 and two holding elements 7 are provided at a distance from one another, each at the same height position 9 and 10, respectively, such that the workpiece table 5 is held on the machine frame 2 by means of four holding elements 6, 7 that are spaced apart from one another. Of these, the two upper holding elements 6 constitute fixed bearings (without piezo actuators) and the two lower holding elements 7 have piezo actuators 24, which are controlled synchronously by the feedback control unit, not represented, in dependence on signals of the sensor 27.

FIG. 2 shows a further exemplary embodiment of a machine tool 1, which is constructed just like the machine tool 1 of FIG. 1, such that all statements made concerning FIG. 1 are likewise applicable in the case of the embodiment of FIG. 2. The only difference is that the workpiece table 5 is realized, not as a rigid table 11—as in the case of FIG. 1—but as a swivelling table 28, which has a base 29 that is connected to the holding device 5, i.e. to the holding elements 6, 7. A table arrangement 30 is mounted on the base 29 such that it can be swivelled about a swivel axis 31. The swivel axis 31 runs horizontally. The table arrangement 30 comprises the table surface 13. The rest of the structure and the functions of the exemplary embodiment of FIG. 2 correspond to those of FIGS. 1 and 3.

Figure 4:
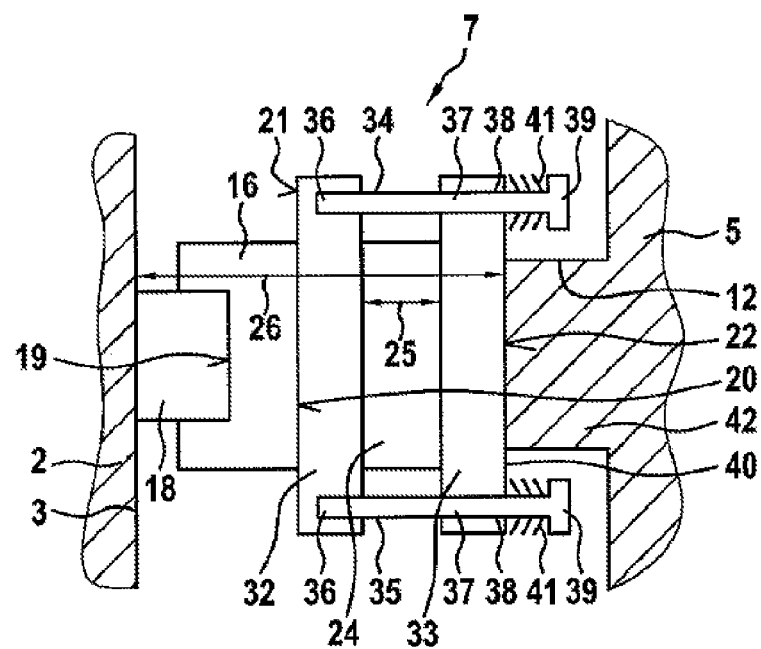
FIG. 4 shows a representation, corresponding to FIG. 3, according to a further exemplary embodiment.

FIG. 4 has a structure of the holding element 7 that is an alternative to FIG. 3, and that can be used in the case of the exemplary embodiment of FIG. 1 or 2. Basically, the structure of the holding element 7 of FIG. 3 corresponds to the structure of the holding element 7 of FIG. 4, such that reference is made to the corresponding statements concerning FIG. 3. The only difference is that, instead of the carrier part 17, in the case of the exemplary embodiment of FIG. 4 there is an arrangement of a first carrier element 32 and a second carrier element 33, which between them accommodate the piezo actuator 24. The two carrier elements 32 and 33 are elastically biased towards one another. This bias is generated in that two bolts 34, 35 are provided, at a distance from one another, which are fixed by their ends 36 to the carrier element 32 and whose shanks 37 go through guide bores 38 of the carrier part 33. The bolts 34, 35 have heads 39, which are at a distance from the outside 40 of the carrier part 33, the thus constituted spacing being filled by a disc spring 41 in each case. As a result, the piezo actuator 34 is clamped in between the carrier elements 32 and 33. The arrangement, which, owing to the disc springs 41, is resilient to that extent, makes it possible to effect alterations in length, which occur as a result of controlling of the piezo actuator 24, as a result of which—just as described in the case of the exemplary embodiment of FIG. 3—it is possible to influence the position of the workpiece table. Because of the projecting heads 39 of the bolts 34, 35, the back wall 12 of the workpiece table 5 is provided with a projection 42, which is located between the heads 39.

Owing to the design according to the invention, tilting of the workpiece table 5, or correspondingly occurring angular errors, can be corrected. Unwanted vibrations can be damped through dynamic engagement of the piezo actuator 24.

Machining of the workpiece and/or differing workpiece weights result in differing loads on the workpiece table 5 and in corresponding angular errors on the workpiece, this angular error being corrected according to the invention, however, by controlling the piezo actuator accordingly. Unwanted vibrations in the machining process are damped by counter-vibrations of the piezo actuator 24. The piezo actuator 24 is therefore used to actively correct any geometry errors of the machine tool 1 that occur. The piezo actuator 24 can perform static and/or also dynamic corrections. Owing to the invention, geometry errors occurring in the machine kinematics are corrected completely, and the workpieces produced are highly accurate. This accuracy is not dependent on the weight of the workpiece. Owing to the invention, unwanted vibrations are damped, the work throughput rate can therefore be increased, and the accuracy and surface quality of the workpiece are improved. The sensor 27, which can be realized, in particular, as a strain gauge, senses the effective deformation (loading) and accordingly controls the feedback control unit, which, in turn, controls the piezo actuator 24, which reacts with a corresponding alteration of length. This alteration of length results in the geometry correction within the machine tool 1.

Where, in the course of this application, reference is made to only one piezo actuator 24 and/or to only one sensor 27, it is clearly also possible for a plurality of such components to be provided at differing positions.

The invention claimed is:

1. Machine tool comprising a machine frame and a workpiece table, the workpiece table (5) has one side (14) which is held on the machine frame (2) by a holding device (4), the holding device (4) has at least two holding elements (6, 7), which are spaced apart from one another on the one side (14) of the workpiece table (5) and are disposed at differing height positions (9, 10) to define an upper and a lower holding element (6, 7), and at least one of the holding elements (6, 7) is equipped with at least one piezo actuator (24) for altering a length of the at least one of the holding elements (6, 7) and influencing the position of the workpiece table relative to the machine frame.

2. Machine tool comprising a machine frame and a workpiece table, the workpiece table (5) has one side (14) which is held on the machine frame (2) by a holding device (4), the holding device (4) has at least two holding elements (6, 7), which are spaced apart from one another on the one side (14) of the workpiece table (5) and are disposed at differing height positions (9, 10) to define an upper and a lower holding element (6, 7), and at least one of the holding elements (6, 7) is equipped with at least one piezo actuator (24) for altering a length of the at least one of the holding elements (6, 7) and influencing the position of the workpiece table relative to the machine frame, wherein the upper holding element (6) constitutes a fixed bearing and the lower holding element (7) is provided with the piezo actuator (24).

3. Machine tool comprising a machine frame and a workpiece table, the workpiece table (5) has one side (14) which is held on the machine frame (2) by a holding device (4), the holding device (4) has at least two holding elements (6, 7), which are spaced apart from one another on the one side (14) of the workpiece table (5) and are disposed at differing height positions (9, 10) to define an upper and a lower holding element (6, 7), and at least one of the holding elements (6, 7) is equipped with at least one piezo actuator (24) for altering a length of the at least one of the holding elements (6, 7) and influencing the position of the workpiece table relative to the machine frame, wherein the holding elements (6, 7) each has a linear guide (18) extending horizontally and each have a holding member (15), the holding member (15) being guided so as to be movable along the linear guide (18).

4. Machine tool according to claim 3, wherein the piezo actuator (24) is disposed between the linear guide (18) and the machine frame (2) and the holding member (15) is provided with the piezo actuator (24).

5. Machine tool according to claim 3, wherein the linear guide (18) is disposed directly on the machine frame (2).

6. Machine tool according to claim 4, wherein the holding member (15) has two carrier elements (32, 33), elastically biased towards one another, between which the piezo actuator (24) is disposed in a clamped manner.

7. Machine tool according to claim 4, wherein the holding member (15) has a single-piece carrier part (17) composed of solid material, which has at least one recess (23) in which the piezo actuator (24) is located.

8. Machine tool according to claim 7, wherein the carrier part (17) is composed of metal.

9. Machine tool according to claim 6, wherein one of the carrier elements (33, 32) is fastened to the workpiece table (5).

10. Machine tool according to claim 6, wherein one side (22) of the carrier part (17) is fastened to the workpiece table (5).

11. Machine tool according to claim 9, wherein the other side of the carrier elements (32, 33) is fastened to the machine frame (2).

12. Machine tool according to claim 10, wherein the other side (21) of the carrier part (17) is fastened to the machine frame (2).

13. Machine tool according to claim 6, wherein the holding member (15) has a guide carriage (16), which can be moved along the linear guide (18), and to which a carrier element (32, 33) is fastened.

14. Machine tool according to claim 6, wherein the holding member (15) has a guide carriage (16), which can be moved along the linear guide (18), and to which the other side (21) of the carrier part (17) is fastened.

15. Machine tool according to claim 1, wherein the workpiece table (5) projects away from the machine frame (2) in the manner of a balcony.

16. Machine tool according to claim 1, wherein the workpiece table (5) is a rigid table (11).

17. Machine tool according to claim 1, wherein the workpiece table (5) is a swivelling table (28), which has a base (29), which is connected to the holding device (4) and on which a table arrangement (30) is mounted such that it can be swivelled.

18. Machine tool according to claim 1, wherein the piezo actuator (24) is controlled in dependence on at least one sensor (27) of the machine tool (1).

19. Machine tool according to claim 18, wherein the sensor (27) is a strain gauge.

20. Machine tool according to claim 18, wherein a control unit and/or feedback control unit, which controls the piezo actuator (24) in dependence on information supplied by the sensor (27).

* * * * *